3,629,152
PROCESS FOR PREPARING ALUMINA-COATED SILICA CATALYST MATERIAL AND THE MATERIAL SO PREPARED
John Francis Lindsley, Glenbrook, and William Eugene Sanborn, Wilton, Conn., assignors to American Cyanamid Company, Stamford, Conn.
No Drawing. Filed Oct. 3, 1967, Ser. No. 672,442
Int. Cl. B01j *11/40*
U.S. Cl. 252—455 R           10 Claims

ABSTRACT OF THE DISCLOSURE

A process for preparing alumina-coated silica catalyst materials is disclosed which comprises the homogenization of a mixture of silica gel containing aluminum salt in aqueous solution and subsequent precipitation of alumina on silica.

---

The present invention relates to an improved process for the preparation of alumina-coated silica based catalyst materials. More particularly, it relates to a novel process for the preparation of alumina-coated silica based catalyst materials of improved properties.

While the principles of the invention may be applied to the production of alumina-coated silica based catalyst materials for any purpose, they are particularly useful in the manufacture of cracking and hydrocracking catalysts, such as those used for the catalytic cracking and hydrocracking of petroleum fractions.

Hitherto, several methods have been employed in the preparation of silica-alumina gel-type catalysts. According to one general method in widespread use, hydrated silica may be precipitated from a dilute solution of an alkali metal silicate, such as commercial water glass, by acidification with a mineral acid, for example, sulfuric acid. The precipitated hydrated silica may then be suspended in an aqueous solution containing an aluminum salt, such as aluminum sulfate or aluminum nitrate, and hydrated alumina may then be precipitated on the hydrated silica by the addition of a basic compound, such as ammonia, whereby a silica-alumina slurry is formed which is adapted to be converted by drying and calcining into a gel-type catalyst material suitable for the above-mentioned purposes. In an alternative method, also in widespread use, precipitation of hydrated alumina is produced by the addition of an alkali metal aluminate, such as sodium aluminate.

During the preparation of the silica-alumina gel and particularly during the acidification of the sodium silicate by the sulfuric acid and the alkalinizing of the aluminum salt by ammonia, alkali metal compounds and water-soluble salts, such as sulfates and ammonium salts, are unavoidably incorporated into the precipitated silica-alumina gelatinous material. It is a requirement of the petroleum industry that these gel-type catalysts be substantially free of such alkali metal and other water-soluble salts inasmuch as such compounds might act as a flux in the finished catalyst composition. This requirement has been brought about by the definite determination that their exclusion or removal is necessary, if catalysts of acceptable initial activity and thermal stability are to be obtained.

It is, however, difficult to remove these objectionable impurities from hydrated gels to the extent desired or necessary for catalytic purposes even by time-consuming procedures including repeated filtration and washing. Moreover, these impurities, and particularly the alkali metal compounds, are absorbed so strongly by the continuous gelatinous coating of silica and alumina on a filter that even with the employment of large quantities of washing fluids, their removal is less than complete. Furthermore, the slow rate of penetration of the washing fluids through a filter cloth coated with a layer of gelatinous material requires considerable time and has increased still further the difficulties in carrying out these methods.

It is, accordingly, an object of the present invention to provide a process for the manufacture of alumina-coated silica based catalyst materials, which process increases the filtration rate of the hydrated gels.

A further object of the present invention is to provide a process for the manufacture of alumina-coated silica based catalyst materials, which process results in a more complete removal upon filtration of alkali metal contaminants than has hitherto been customary.

Another object of the present invention is to provide a process for the manufacture of alumina-coated silica based catalyst materials, which materials have improved properties over those obtained by former processes.

Still further, it is an object of the present invention to provide a process for the manufacture of alumina-coated silica based catalyst materials, which materials have improved performance over those obtained by former processes.

These and other objects of the present invention will become more apparent from the detailed description thereof set forth hereinbelow.

According to the present invention a novel process is provided for the preparation of improved alumina-coated silica based catalyst materials which comprises preparing a silica hydrogel by known procedures, adding to said hydrogel a soluble aluminum salt in aqueous solution, homogenizing the hydrogel containing said aluminum salt, adding an alumina precipitant to the homogenized hydrogel to form an alumina-coated silica hydrogel, and subsequently washing and drying the coated hydrogel.

The process provides improved filtration characteristics to the resulting hydrogel slurry enabling more rapid and more complete removal of contaminating salts to be achieved with less water usage than hitherto obtainable. In addition, the catalyst materials produced in accordance with the process of the present invention have improved attrition resistance, more uniform distribution of $Al_2O_3$ after spray drying, increased tolerance for alumina within the catalyst structure without giving rise to free $Al_2O_3$, and a more uniform distribution of molecular sieves as will be described more fully hereinafter.

The term "hydrogel" as that term is employed herein refers to gels, precipitated gels, hydrous oxide precipitates, or combinations thereof, in an undried state, and usually washed free of salts resulting from gelation or precipitation reactions. Water is a major component of these materials comprising 80 to about 95% of its weight. The water is held in a semi-rigid particulate form within the pores or interstices of the hydrogel particles. Thus, hydrogels distinguish from sols and dried gels, the term "sol" referring to colloidal dispersions which are macroscopically homogeneous and opalescent in appearance and characterized by the flow properties of a true liquid, and the dried gel refers to the product obtained by drying hydrogels whereby the structure of the oxide gel is set for the most part irreversibly. While dried gels may contain a residuum of combined water, i.e., as much as 50% by weight, they are considered to be essentially dry and to be rigid solids.

By the term "catalyst materials" as employed herein is meant materials which are used to form catalysts, usually by additional treatment thereof.

Silica hydrogels or hydrated silica gel may be prepared by precipitating silica from an alkali metal silicate, such as sodium silicate, with a material such as sulfuric acid under conditions of pH, temperature, agitation, and the like known to those skilled in the art.

Alumina hydrogels may be prepared by precipitation from a water solution of a water-soluble aluminum compound which may be either an aluminum salt such as aluminum sulfate, aluminum nitrate, aluminum chloride, and the like or an alkali metal aluminate such as sodium or potassium aluminate or both.

Alumina-coated silica based hydrogels are prepared by first forming a silica hydrogel and then forming an alumina hydrogel in contact therewith.

In carrying out the process of the present invention, a silica hydrogel is prepared in accordance with conventional procedures. The hydrogel may contain inorganic additive materials, fillers, or extenders, as for example various kaolin clays, and described in more detail in U.S. Pat. No. 3,023,172. The additive, when used, is in amounts such as to constitute up to about 50% by weight of the total final catalyst material composition. Amounts in excess of about 50% are detrimental to catalyst performance. While no additive is required, it is generally preferable to add between about 40% and 50% by weight of the total final catalyst material composition for economic advantages, especially where molecular sieves are also incorporated in the catalyst material.

After the silica hydrogel has been prepared, a suitable amount of a water solution of a water-soluble aluminum salt is added thereto. The hydrogel with its content of aluminum salt in solution is then subjected to homogenization. After homogenization, a suitable precipitant is added to deposit alumina as a coating on the silica hydrogel. The amount of alumina employed in coating the silica hydrogel may vary from about 5% to about 45% and preferably from 10% to about 40% based on the dry weight of the silica-alumina. The amount of aluminum salt added to the silica hydrogel will be governed by the amount of alumina coating desired and the nature of the alumina precipitant. When, for example, alumina is precipitated by addition of ammonia to the homogenized silica hydrogel containing aluminum salt in solution, the amount of aluminum salt will be sufficient to provide this alumina content, with the amount of ammonia added being sufficient to precipitate substantially all of the aluminum salt as alumina. When, in other cases, alumina is precipitated by the interaction of two water-soluble aluminum salts, such as, for example, aluminum sulfate and sodium aluminate, the amount of such salt added to the silica hydrogel prior to homogenization will be that amount which when interacted with the second salt will produce the desired alumina content. When two aluminum salts are used to form alumina, it is generally necessary to add the acid salt to the silica hydrogel prior to homogenization and subsequently add the alkaline salt.

It is an advantage of the present invention that the amount of alumina that can be incorporated in the catalyst material in intimate contact with silica, i.e., without the appearance of free $Al_2O_3$, is considerably higher than that of the former processes. Thus, in former processes when an alumina content in excess of about 30% was present, free $Al_2O_3$ could generally be detected. In the present invention, however, at alumina content in excess of 40%, free $Al_2O_3$ can not be detected. In addition, at whatever content employed, the alumina distribution among the screen fractions of the catalyst material of the present invention is considerably more uniform than in comparable catalyst materials of former processes.

Generally, any apparatus which is capable of reducing the particle size of the silica hydrogel is useful in carrying out the homogenization using appropriate mesh screens in step, in effect, changes the normal particle size distribution of the silica hydrogen from one having numerous larger particles, i.e., circa 40 mesh size, to one having a greatly reduced content of larger particles and consequently an increase in content of smaller particles, i.e., circa 100 mesh size and smaller. A Fitzmill is ideally suited for carrying out the homogenziation using appropriate mesh screens in conjunction therewith.

After the alumina coating has been applied to the silica hydrogel, the coated hydrogel is then processed further depending upon the nature of the particular catalyst material desired. Such further processing generally includes the steps of washing and spray drying, which steps may be in either order. While it is generally preferable to wash the coated hydrogel prior to spray drying thereof in order to take advantage of the improved filtration characteristics of the hydrogel, this is not a necessary restriction since improved catalyst materials will still result when washing is carried out subsequent to spray drying. When the catalyst material is washed subsequent to spray drying, it will possess improved alumina and sieve distribution, where employed, in the screen fractions and exhibit higher activity-selectivity than previous catalyst materials or similar composition, as well as other improvements.

In washing the coated silica hydrogel or dried gel, conventional procedures are employed. In washing the hydrogel, it is generally preferable to use a rotary vacuum filter employing three filtration stages. Prior to the third stage, if desired, pH adjustments may be effected in the alumina-coated hydrogel. Such adjustments are generally made by adding dilute ammonia solution to the slurry being filtered. Acid solutions are also contemplated, however, if necessary.

It is contemplated within the scope of the present invention to incorporate molecular sieves within the catalyst material formed. These molecular sieves are synthetic alkali metal aluminosilicates, sometimes called synthetic crystalline zeolites, which have their alkali metal content base-exchanged by reacting the zeolite with various metal salt solutions whose metal ion, which is usually polyvalent, can replace the alkali metal. Preferably the metal ion employed is one derived from a rare earth element. Preferred zeolites include Zeolite Y, as described in U.S. Pats. Nos. 3,130,007; 3,140,249 and 3,140,253, and Zeolite X, as described in U.S. Pat. No. 2,882,244.

The synthetic zeolite, or molecular sieve, may be incorporated into the catalyst material at various points during its manufacture. It may be incorporated with the silica hydrogel prior to the coating with alumina. Alternatively, it may be incorporated into the silica hydrogel containing aluminum salt before the homogenization step, or, if desired, after homogenization and before precipitation of alumina. Another alternative is to add the sieve after precipitation of alumina but prior to washing of the coated hydrogel. A preferred point of incorporation, however, of the sieve is subsequent to washing of the alumina-coated hydrogel but prior to the drying, preferably by spray drying. The amount of sieve that can be incorporated into the catalyst material will depend to some extent upon the benefits derived therefrom and to some etxent upon the physical properties of the resulting catalyst material.

We have found that at any level of normal usage of sieves, i.e., 3–15% by weight of the final catalyst, in the catalyst material produced in accordance with the present invention, higher resistance to attrition is obtained in the catalyst material and that higher usages of sieves are possible while still obtaining high attrition resistance by our process than by conventional processes. Thus, it is possible to employ sieves to the extent of about 15% by weight of the final catalyst composition in our process and still obtain attrition resistance equivalent to that obtained in former catalyst materials having a sieve content of less than half this amount. In addition, the distribution of sieves within the screen fractions of the catalyst material is always more uniform by our process of preparation than by former processes.

At the appropriate point in the process of preparing the catalyst materials, the alumina-coated hydrogel is spray dried, as for example by employing the apparatus described in U.S. Pat. No. 2,644,516.

It is contemplated that the catalyst materials produced in accordance with the process of the present invention may have various promoters incorporated therein. Such incorporation may be at the time of formation of the silica or alumina hydrogel or subsequent to spray drying of the coated catalyst material. The promoters that may be employed are those which are conventionally employed at effective levels, as is well known in the art.

The catalyst materials obtained by the process of the present invention are eminently suitable for use in the preparation of catalysts for use in cracking or hydrocracking processes wherein advantage is taken of their improved properties.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples reference is made to physical properties such as attrition, gasoline factor, screen fractions, etc. These are determined in accordance with the manual Test Methods for Synthetic Fluid Cracking Catalyst, Revised Edition, published by American Cyanamid Company, New York, N.Y., 1957, unless otherwise specified.

EXAMPLE 1

To a suspension of 44 lbs. of kaolin clay (14% loss on ignition) in 645 lbs. of water were added 105 lbs. of a commercial solution of sodium silicate in water, containing about 28.5% $SiO_2$. A 25% aqueous solution of sulfuric acid was added to the agitated mixture, which was maintained at 100° F., in an amount and at such a rate as to lower the pH from 11.0 to 8.0 over a period of 18 minutes. At this point the mixture gelled and acid addition was stopped while the gel was broken up. The acid addition was then resumed to bring the pH down to 7.0. Next, 54 lbs. of 26% aqueous $Al_2(SO_4)_3$ was added to the mixture. The mixture was then homogenized by passing it throuh a Model D Fitzmill using a 60 mesh screen therein.

To the homogenized mixture was then added 17 lbs. of sodium aluminate solution containing the equivalent of 25% $Al_2O_3$, over a period of about 25 minutes. A small quantity of ammonia, 14% aqueous, was added to adjust the pH to 4.8. The relative portions of silica and alumina formed were such as to form a silica based catalyst material having an alumina content of 31% on a dry basis.

The resulting hydrogel was washed three times on a rotary vacuum filter using deionized water. Just prior to the third wash, the slurry pH was raised to 7.2 by the addition of 14% aqueous ammonia solution.

After washing, the hydrogel was divided into three portions. One portion was spray dried by conventional procedures without further modification. To the other portions were added base-exchanged molecular sieves to the extent of 3.7% in one case and 8.8% in the other, both percentages based on the dry weight of the catalyst material. After incorporation of the sieves, these portions of the hydrogel were spray dried as the first.

In Table I are listed values of certain properties of the catalyst materials thus produced. The sieve percentage in the screen fractions was determined by analysis for the metal ion used in base-exchanging the sieve.

The comparative data given are those obtained with catalyst materials prepared following the procedure given above in every material detail except that the homogenization step is omitted.

TABLE I.—PROPERTIES OF CATALYST MATERIALS

|  | Catalysts of Example 1 | | | Comparative data | |
|---|---|---|---|---|---|
| Molecular sieves, percent added | 0 | [1] 3.7 | 8.8 | 0 | 3.7 |
| 1 hour attrition | 5.0 | 6.5 | 12.0 | 7.8 | 11.2 |
| Screen fractions at mesh sizes indicated and molecular sieve content thereof | | | | | |
| —100, +170, percent: | | | | | |
| Weight | | 24 | 24 | | 7 |
| Sieve | | 3.5 | 8.8 | | 3.0 |
| —200, +270, percent: | | | | | |
| Weight | | 28 | 28 | | 33 |
| Sieve | | 3.7 | 8.8 | | 3.6 |
| —325, percent: | | | | | |
| Weight | | 16 | 15 | | 25 |
| Sieve | | 3.7 | 8.8 | | 3.8 |
| Activity AGC method (VHSV of 2.4 for 15 minutes instead of 1.4 for 1 hour) | | | | | |
| Sieves, percent added | | [1] 3.7 | | | 3.7 |
| Conversion percent: | | | | | |
| Steamed at 576° F. for 17 hours | | 65 | | | 63 |
| Steamed at 750° F. for 17 hours | | 60 | | | 58 |
| Gasoline factor:[2] | | | | | |
| Steamed at 576° F. for 17 hours | | 1.22 | | | 1.13 |
| Steamed at 750° F. for 17 hours | | 1.22 | | | 1.17 |

[1] Average of two determinations.
[2] Ratio of the products, as examined by mass spectroscopy, that could be used in the manufacture of gasoline for the specific sample run and a standard.

It can be seen from the above data that the catalyst materials prepared in accordance with the process of the present invention have lower attrition values, improved sieve distribution within the screen fractions, and better activity, as indicated by conversion and gasoline factor, than comparable catalyst materials prepared by the prior art procedure. It is to be particularly noted that the attrition value of the catalyst material of the present invention containing 8.8% molecular sieve is comparable to that of the prior art catalyst material having less than half this content of sieve.

EXAMPLE 2

Dilute sulfuric acid (25% aqueous $H_2SO_4$) was added to a solution of 160 lbs. of sodium silicate (approximately 28.5% $SiO_2$) in 340 lbs. of 135° F. water. Over a period of 11 minutes the pH dropped from 11.3 to 10.5 as a result of the addition and at this point the batch gelled. The acid addition was stopped and the gel aged for 14 minutes at a temperature of 125° F. The pH was then lowered to 7.0 with additional acid addition.

132 lbs. of 25% $Al_2(SO_4)_3$ solution in water were added further reducing the batch pH to 2.9.

The batch was then homogenized by passing it through a Model D Fitzmill using an 80 mesh screen in the mill. The tank, lines and Fitzmill were flushed with 350 lbs of water. 39.8 lbs. of aqueous sodium aluminate solution (24% $Al_2O_3$) were added to the homogenized batch over a period of 37 minutes. The batch pH was adjusted to 4.9 by the addition of 14% aqueous ammonia solution.

The hydrogel was given three stages of washing and repulping employing a rotary vacuum filter and deionized water. The pH of the slurry was adjusted to 8.5 by the addition of aqueous 14% ammonia solution just prior to the third stage. The washed hydrogel was then spray dried in accordance with conventional procedures.

Various properties of the catalyst material thus formed are given in Table II. The comparative data listed therein were obtained with a catalyst material prepared in accordance with the procedure of this example in every material detail except that the homogenization step was omitted.

EXAMPLE 3

Following the procedure of Example 2, additional catalyst material was prepared. The dilution and age time of the hydrogel were adjusted in accordance with procedures well known to those skilled in the art to give a higher pore volume in the catalyst material thus produced. Various properties of the catalyst material thus produced are also given in Table II.

EXAMPLE 4

Following the procedure of Example 2, additional catalyst material was prepared. The dilution and age time of the hydrogel were adjusted in accordance with procedures well known to those skilled in the art to give a lower pore volume in the catalyst material thus produced. In addition, additional $Al_2(SO_4)_3$ and sodium aluminate were added to increase the alumina coating to 40% based on the dry weight of the catalyst material thus produced. Various properties of the catalyst material thus produced are also given in Table II.

The data given in Table II show the reduced contents of alkali metal and sulfate ion obtainable in the catalyst materials of the present invention compared with those of the prior art. The data also show the improved attrition of the catalyst materials of the present invention over those of comparable catalyst materials of the prior art. The improved alumina distribution within the screen fractions is also shown, including that of the catalyst material of the present invention containing 40% alumina.

TABLE II.—VARIOUS PROPERTIES OF CATALYST MATERIALS

| Example | 2 | 3 | a 4 | Comparative data |
|---|---|---|---|---|
| Percent $Na_2O$ (dry basis) | 0.006 | 0.006 | 0.005 | 0.02 |
| Percent $SO_4$ (dry basis) | 0.15 | 0.36 | 0.12 | 0.80 |
| Pore volume, cc./g | .78 | .97 | .64 | .88 |
| Surface area, m.²/g | 470 | 454 | 396 | 525 |
| ABD, gms./cc | .44 | .39 | .49 | .43 |
| 1 hr. attrition | 9.7 | 12 | 17 | 16 |
| Alumina distribution: | | | | |
| −140, +170 mesh percent $Al_2O_3$ b | 30.0 | 28.6 | 39.1 | 25.7 |
| −200, +270 mesh percent $Al_2O_3$ b | 29.8 | 28.9 | 39.1 | 26.3 |
| −325 mesh percent $Al_2O_3$ b | 30.3 | 29.3 | 40.2 | 27.6 | a Examination of the catalyst material both by X-ray and D.T.A. in accordance with the method of Sey and Rase, I. and E. Chem. Prod. Res. and Dev., 5, No. 3, pp. 250–252 (1966) indicated that no free $Al_2O_3$ was present.
b Weight percent of alumina in screen fraction.

EXAMPLE 5

Following the procedure of Example 2, except that a greatly increased batch size was involved employing necessarily larger equipment, additional catalyst material was prepared. Appearance of the filter cake obtained in accordance with the process of the present invention as well as the filtration rate and water usage were recorded. Corresponding records obtained when the catalyst material was prepared in the same manner except that the homogenization step was omitted were employed as standards. No "fish eyes" were noted on the filter cake of the catalyst material of the present invention while they were evident in the case of the prior art procedure. "Fish eyes" are slimy, opalescent masses interspersed in the filter cake and represent silica not adequately coated with alumina, since they form during the silica hydrogel strike. The filter cake obtained in the process of the present invention enabled a 33% faster filtration rate to be achieved with a 33% decrease in water usage during washing than that of the prior art procedure.

This example shows the improved filtration characteristics obtainable by the process of the present invention while still yielding catalyst materials of improved properties.

EXAMPLE 6

Following the procedure of Example 2, additional catalyst materials were prepared except that the amount of alumina employed as coating was varied. Similar improvements in hydrogel processing and in properties of the catalyst materials obtained as reported in Examples 5 and 1, respectively, were obtained with alumina coatings from 5% to 45% based on the dry weight of the silica-alumina.

EXAMPLE 7

Following the procedure of Example 2, an additional catalyst material was prepared except that the precipitant for alumina was ammonia and the content of aluminum salt in the silica hydrogel prior to homogenization was increased accordingly. Properties obtained in the final catalyst material were substantially the same as those reported for the catalyst material of Example 2.

EXAMPLE 8

Following the procedure of Example 1 except for variations in the amounts of molecular sieve added, additional catalyst materials were prepared. Sieve additions of up to 15% based on the dry weight of the catalyst material were employed. Corresponding benefits in attrition resistance, in sieve distribution within the screen fractions, and in catalyst activity to those indicated in Example 1 were obtained.

We claim:
1. A process for preparing alumina-coated silica based catalyst material in which the alumina is uniformly distributed throughout the silica base, which comprises adding an aqueous solution of an aluminum salt to silica hydrogel, homogenizing the hydrogel-aluminum salt composition, precipitating alumina from the aluminum salt to form an alumina-coated silica hydrogel material and drying the material thus formed.
2. The process of claim 1 wherein an inorganic additive material is present in the silica hydrogel in an amount up to 50% by weight of the dried catalyst material.
3. The process of claim 1 wherein base-exchanged molecular sieves up to a content of 15% by weight of the dried catalyst material are incorporated in the alumina-coated hydrogel prior to drying.
4. The process of claim 2 wherein the additive is a kaolin clay.
5. The process of claim 3 wherein the molecular sieve employed is a Zeolite Y type sieve, base-exchanged with a rare earth metal ion.
6. The process of claim 3 wherein the molecular sieve employed is a Zeolite X type sieve, base-exchanged with a rare earth metal ion.
7. The process of claim 3 wherein precipitated alumina is present to the extent of 5–45% in the catalyst material and the molecular sieve is employed at 3–15%, both contents by weight of the dried catalyst material.
8. The process of claim 1 wherein an inorganic additive material is present with the silica hydrogel and molecular sieves are incorporated into the alumina-coated hydrogel prior to drying.
9. Alumina-coated silica based catalyst materials containing up to 15% by weight thereof on a dry basis of base-exchanged molecular sieves, said catalyst materials having substantially the same distribution of sieves in the various screen fractions of said catalyst material.
10. Alumina-coated silica based catalyst materials having an alumina content in the range of 30 to 45% by weight of the dry catalyst material and substantially the same alumina content in the various screen fractions of said catalyst materials.

References Cited

UNITED STATES PATENTS

| 3,118,845 | 1/1964 | Innes et al. | 252—453 |
| 3,210,294 | 10/1965 | Chomitz et al. | 252—453 |
| 3,324,048 | 6/1967 | Plank et al. | 252—455 |
| 2,695,893 | 11/1954 | Howdry | 252—451 |
| 2,701,793 | 2/1955 | Ashley | 252—451 |

DANIEL E. WYMAN, Primary Examiner

C. F. DEES, Assistant Examiner

U.S. Cl. X.R.

252—455 Z